United States Patent
Rohlfing et al.

(10) Patent No.: US 11,641,219 B2
(45) Date of Patent: May 2, 2023

(54) DSL LINE INTERFERENCE SUSCEPTIBILITY

(71) Applicant: BRITISH TELECOMMUNICATIONS PUBLIC LIMITED COMPANY, London (GB)

(72) Inventors: David Rohlfing, London (GB); Paul Benyon, London (GB); Phil Bull, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 23 days.

(21) Appl. No.: 17/599,192

(22) PCT Filed: Mar. 13, 2020

(86) PCT No.: PCT/EP2020/056996
§ 371 (c)(1),
(2) Date: Sep. 28, 2021

(87) PCT Pub. No.: WO2020/200712
PCT Pub. Date: Oct. 8, 2020

(65) Prior Publication Data
US 2022/0158688 A1   May 19, 2022

(30) Foreign Application Priority Data
Mar. 29, 2019   (EP) ..................................... 19166139

(51) Int. Cl.
*H04B 3/32* (2006.01)
*H04B 3/487* (2015.01)
(Continued)

(52) U.S. Cl.
CPC ............... *H04B 3/32* (2013.01); *H04B 3/487* (2015.01); *H04M 3/2209* (2013.01); *H04M 3/30* (2013.01); *H04B 3/00* (2013.01); *H04B 3/46* (2013.01)

(58) Field of Classification Search
CPC . H04B 3/32; H04B 3/487; H04B 3/46; H04B 3/00; H04M 3/2209; H04M 3/30; H04M 3/306
See application file for complete search history.

(56) References Cited

U.S. PATENT DOCUMENTS

| | | | |
|---|---|---|---|
| 6,978,015 | B1 | 12/2005 | Erickson et al. |
| 7,440,552 | B2 * | 10/2008 | Lunt ....................... H04M 3/30 379/27.01 |

(Continued)

FOREIGN PATENT DOCUMENTS

| | | |
|---|---|---|
| EP | 2 266 300 | 12/2010 |
| EP | 2 784 969 | 10/2014 |

(Continued)

OTHER PUBLICATIONS

International Search Report and Written Opinion of the ISA for PCT/EP2020/056996, date Apr. 14, 2020, 10 pages.

(Continued)

*Primary Examiner* — Lisa Hashem
(74) *Attorney, Agent, or Firm* — Nixon & Vanderhye P.C.

(57) ABSTRACT

A method is presented of determining whether a digital subscriber line is susceptible to radio frequency interference. The method measures the signal to noise ratio (SNR) margin on the digital subscriber line over a number of 24 hour periods. The measured SNR margin over a given 24 hour period is then compared to a reference function of SNR margin over time (24 hours), where the SNR margin of the reference function is higher during the day and lower during the night, and also repeats daily. A measure of the interfer- (Continued)

ence susceptibility is generated based on the degree of similarity between the measured SNR margin and the reference function.

14 Claims, 6 Drawing Sheets

(51) Int. Cl.
  *H04M 3/22* (2006.01)
  *H04M 3/30* (2006.01)
  *H04B 3/00* (2006.01)
  *H04B 3/46* (2015.01)

(56) References Cited

U.S. PATENT DOCUMENTS

| | | | | |
|---|---|---|---|---|
| 7,515,691 | B2 * | 4/2009 | Warner | H04M 3/306 |
| | | | | 379/1.04 |
| 7,733,224 | B2 * | 6/2010 | Tran | A61B 8/565 |
| | | | | 340/8.1 |
| 8,644,435 | B2 | 2/2014 | Drooghaag et al. | |
| 9,385,780 | B2 * | 7/2016 | Alloin | H04L 27/2688 |
| 9,420,090 | B2 | 8/2016 | Mohseni et al. | |
| 9,425,858 | B2 * | 8/2016 | Singh | H04B 3/32 |
| 9,787,428 | B2 | 10/2017 | Gedge et al. | |
| 9,998,590 | B2 * | 6/2018 | Gedge | H04M 3/306 |
| 10,194,020 | B2 | 1/2019 | Gedge et al. | |
| 10,264,136 | B2 * | 4/2019 | Linney | H04M 11/062 |
| 11,356,143 | B2 * | 6/2022 | Bennett | H04B 3/54 |
| 11,502,881 | B2 * | 11/2022 | Lin | G11C 7/20 |
| 11,531,632 | B2 * | 12/2022 | Brox | G06F 13/1668 |
| 2016/0352499 | A1 | 12/2016 | Gedge et al. | |
| 2019/0335445 | A1 * | 10/2019 | Forenza | H04B 7/024 |
| 2022/0109243 | A1 * | 4/2022 | Henry | H01Q 19/08 |
| 2022/0158688 | A1 * | 5/2022 | Rohlfing | H04B 3/487 |
| 2023/0032217 | A1 * | 2/2023 | Sjöland | H04L 27/02 |

FOREIGN PATENT DOCUMENTS

| | | |
|---|---|---|
| EP | 2 832 044 | 2/2015 |
| EP | 2 928 107 | 10/2015 |
| EP | 2 976 839 | 1/2016 |
| WO | 2014/096752 | 6/2014 |
| WO | 2015/114326 | 8/2015 |

OTHER PUBLICATIONS

Search Report for EP 19166139.6 dated Jul. 1, 2019, 7 pages.
Search Report for GB 1904404.9 dated Sep. 23, 2019, 4 pages.
"Method for Identifying DSL line susceptible to air-born RF interference", Stellarix Search report, Sep. 17, 2018, 31 pages.
Examination Report and Notification of Intention to Grant under Section 18(4) dated Jul. 22, 2022 issued for GB1904404.9 (2 pages).
International Preliminary Report on Patentability for PCT/EP2020/056996 dated Oct. 14, 2021 (7 pages).

* cited by examiner

DSL LINE INTERFERENCE SUSCEPTIBILITY

This application is the U.S. national phase of International Application No. PCT/EP2020/056996 filed 13 Mar. 2020, which designated the U.S. and claims priority to EP Patent Application No. 19166139.6 filed 29 Mar. 2019, the entire contents of each of which are hereby incorporated by reference.

FIELD OF THE INVENTION

This invention relates to a method of identifying digital subscriber lines that are susceptible to air-borne radio frequency interference.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an ISP.

Broadband lines are prone to faults. There are broadly two classes of faults with broadband lines. The first concerns the metallic pair, particularly the quality of the metallic path, for example bad or unstable joints. The second concerns radio frequency (RF) noise interference in the frequency bands used for broadband. The methods for tackling each class of fault vary greatly.

The presence of RF interference issues may be determined from a number of methods that could include observation that the error rate is higher than expected, or that the line rate is lower than expected.

Different approaches may be required to resolve RF interference issues. With one approach, the source of RF interference could be removed, but identifying such sources is often a difficult task requiring advanced diagnostic skills, especially if the interference is intermittent in nature. And even when the source has been identified, it is not always possible to negate it e.g. if the owner of equipment generating the RF interference is unwilling to help.

With another approach, the line itself could be inspected to remove any issues such a wiring imbalance that might cause it to be particularly susceptible to RF interference. The balance of the two legs of the twisted metallic pair that makes up a DSL line helps reduce the susceptibility of the line to RF interference. Where the two legs are not balanced, it is usually because of the presence of subtly different quality joints within the path or the presence of additional wiring on one of the legs e.g. a bell wire. This can cause the system to behave as an aerial picking up external RF interference. The presence of such an imbalance can be determined by an engineer using standard test equipment once they have been dispatched for repair.

The task of identifying/removing an imbalance from the line is significantly more straightforward than the task of identifying/removing interference sources. Therefore, it would be advantageous to be able to distinguish between the two before engineer dispatch.

SUMMARY OF THE INVENTION

According to one aspect of the present invention, there is provided a method of determining the interference susceptibility of a digital subscriber line, said method comprising the steps of:

determining the signal to noise ratio margin of the digital subscriber line over a period of time;

selecting a reference function of a signal to noise ratio margin over time, where the signal to noise ratio margin of the reference function is higher during the day and lower during the night, and the reference function repeats daily;

comparing the measured signal to noise ratio margin over time to the reference function;

determining the interference susceptibility in dependence on the result of the comparing step.

The comparing step may comprise performing numerical analysis of the signal to noise ratio margin and the reference function. In particular, the numerical analysis may comprise regression analysis.

The regression analysis may generate a quality of fit parameter and a strength of fit parameter, and the comparing step may then further comprise comparing the generated parameters with predetermined thresholds.

The result of the comparing step may be the result of the comparison of the generated parameters with the predetermined thresholds.

Preferably, the period of time is one day.

The signal to noise ratio margin may be the downstream signal to noise ratio margin.

According to a further aspect of the present invention, there is provided a line analysis unit for determining the interference susceptibility of a digital subscriber line adapted to:

determine the signal to noise ratio margin of the digital subscriber line over a period of time;

select a reference function of a signal to noise ratio margin over time, where the signal to noise ratio margin of the reference function is higher during the day and lower during the night, and the reference function repeats daily;

compare the measured signal to noise ratio margin over time to the reference function;

determine the interference susceptibility in dependence on the result of the comparing step.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of determining whether a digital subscriber line is susceptible to radio frequency interference. The method measures the signal to noise ratio (SNR) margin on the digital subscriber line over a number of 24 hour periods. The measured SNR margin over a given 24 hour period is then compared to a reference function of SNR margin over time (24 hours), where the SNR margin of the reference function is higher during the day and lower during the night, and also repeats daily. A measure of the interference susceptibility is generated based on the degree of similarity between the measured SNR margin and the reference function.

This "diurnal" reference function models the expected SNR margin of a line that is experiencing RF interference resulting from broadcast radio transmissions. The radio transmissions are typically from medium wave radio stations, which broadcast on frequencies that overlap with, and thus are capable of interfering with, DSL frequencies. The SNR margin of such a reference function varies diurnally, and is lowest (due to greatest interference) at night, and highest (least interference) during the day. The similarity between the SNR margin of the line and the reference pattern shows how susceptible that line is to RF interference.

Figure 1:
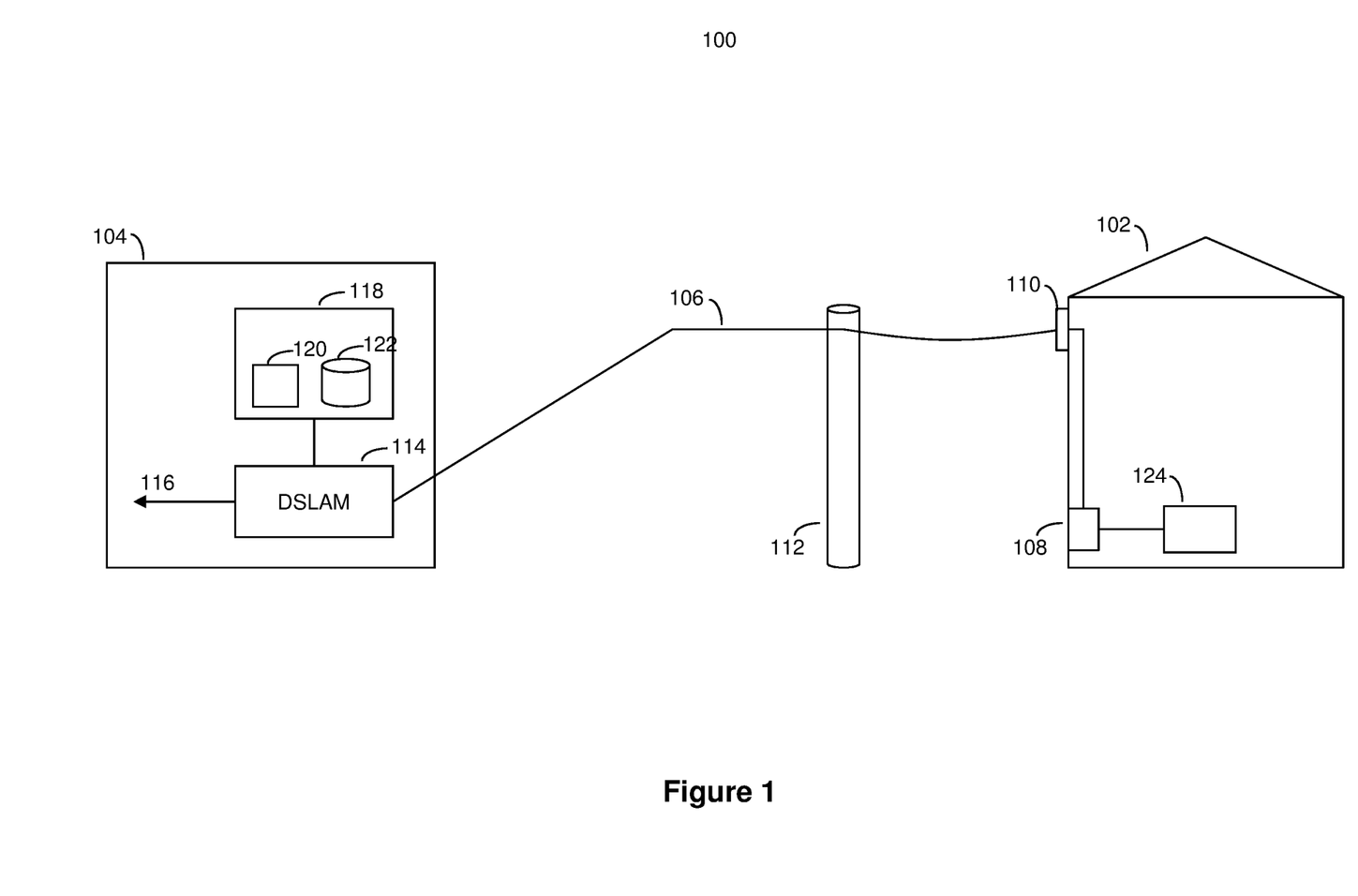
FIG. 1 is a system diagram showing a telephone exchange and a digital subscriber line running to a customer premises.

FIG. 1 illustrates a telecommunications network 100 including a customer's premises 102. The customer's premises 102 is connected to a telephone exchange 104 via a telephone line 106. The telephone line is a twisted copper or aluminium pair of wires. Specifically, a network termination equipment NTE 108 is at the customer premises 102 end of the line 106. The NTE 108 is often referred to as a line box or master socket, and is the demarcation point between the telephone network and the customer wiring in the customer premises 102. The line 106 runs from the NTE 108 to a junction box 110, and then onto a distribution point DP 112. In this example, the DP 112 is a junction on a telephone pole. The line 106 then continues onto the exchange 104 where it terminates a digital subscriber line access multiplexer, DSLAM, 114. Within the customer premises 102, the NTE 108 is connected to customer premises equipment CPE 124, typically a router or home hub.

The DSLAM is a network element that provides digital subscriber line (DSL) services to connected lines and associated customer premises. The line 106 is thus also referred to as digital subscriber line, or DSL line. At the exchange is also a line analysis unit 118, connected to the DSLAM 114. The line analysis unit 118 comprises a processor 120, and a data store 122, such as hard disk array or similar. The line analysis unit 118 gathers various measurements, including signal to noise ratio (SNR) margin data, made by the DSLAM 114, stores them in the data store 122, and the processor 120 uses the stored measurements to determine the condition of a line. The line analysis unit 118 may obtain some of its measurements from the CPE 124.

The DSLAM 114 also has onward connections 116 to data provisioning networks. A skilled person will also appreciate that there are other elements in the exchange 104, such as elements that provide standard PSTN services to connected lines. However, these have been omitted for simplicity.

Whilst the present example shows a DSLAM residing in the exchange 104, the invention would still be applicable to configurations where the DSLAM is situated somewhere else. For example, in a fibre to the cabinet (FTTC) arrangement, the DSLAM 114 would be located in a roadside cabinet, which is typically located nearer the customer premises than the exchange. In an alternative network arrangement, DSLAM like functionality can be provided by an MSAN (multi services access node), which also provides other capabilities such as voice.

Figure 2:
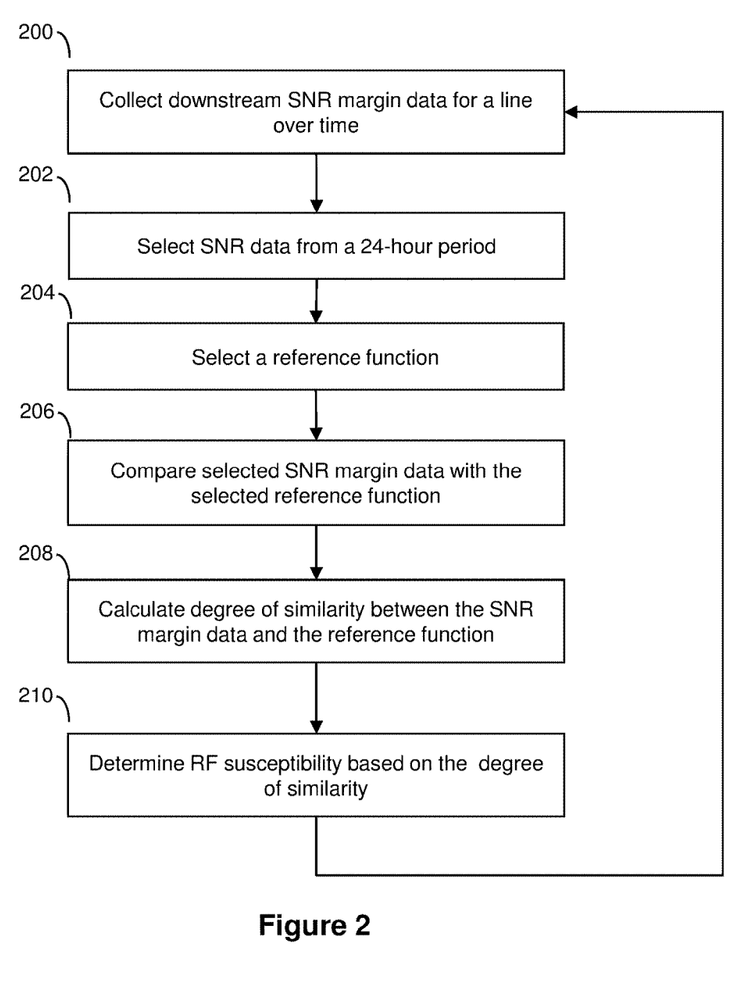
FIG. 2 is a flow chart summarising the steps of an example of the invention.

FIG. 2 is a flow chart summarising the steps of the present invention as performed by the line analysis unit 118.

The steps of FIG. 2 may be performed reactively (e.g. in response to a customer reporting a problem on their specific line) or proactively (e.g. without knowledge of any specific problem) on a line.

In step 200, the line analysis unit 118 collects the SNR margin data associated with the line 106 over a period of time. The SNR margin data is preferably the downstream SNR margin data, and sampled at regular intervals (in this example every 15 minutes). The line analysis unit 118 can store these measurements in the data store 122. The data can be collected over more than one 24 hour period.

In step 202, a 24 period of SNR margin data is selected from the data collected and stored in step 200. In practice, many days' worth of data might be collected, and the invention could be applied to data from any one of those days. In this example, the most recent day (24-hour period from midnight to midnight) is selected for analysis.

Figure 3:
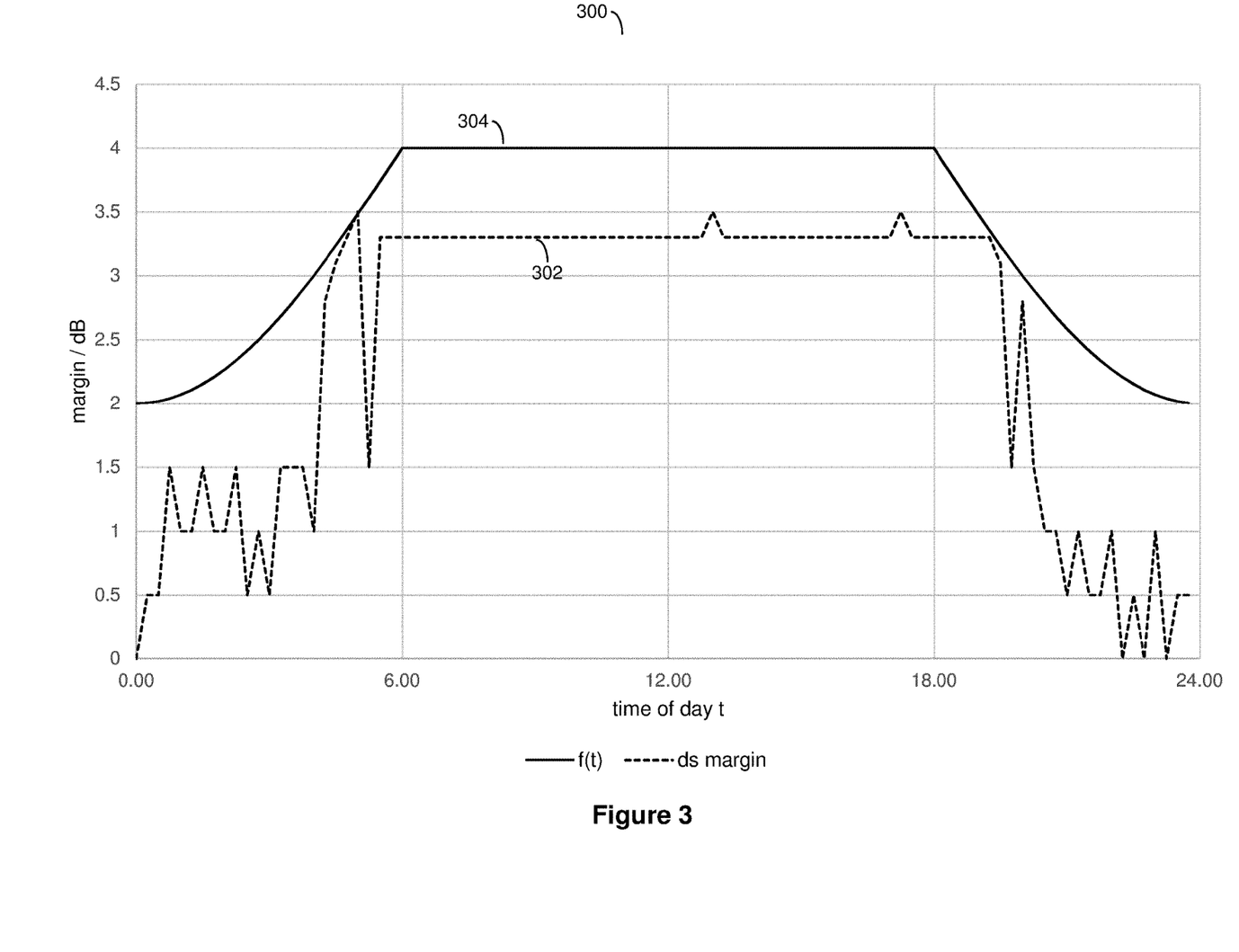
FIG. 3 is a graph showing the SNR margin of a line susceptible to RF interference, and of a reference function, in an example of the invention.

In step 202, a reference function is selected by the line analysis unit 118. The reference function represents the downstream SNR margin over a 24-hour period of a line that is susceptible to RF interference. The reference function selected for use in this example varies through the day, with the SNR margin being higher during the day and lower during the night. An example of such a reference function is shown in FIG. 3, plot 304, measured in dB (SNR margin) as a function of t (time of day).

This reference function is particularly effective as it reflects the effects of the variation in intensity of distant radio broadcast signals due to regular (daily) changes in the ionosphere. During the daytime, these additional distant signals do not travel very far and thus do not contribute to any interference, but during the night they travel further and thus do contribute to interference. These signals provide a regular source of RF interference at frequencies shared by DSL systems, and particularly impacts ADSL systems. For lines that are well balanced these signals have very little impact. However, for lines that are not well balanced across the metallic pair (e.g. when a bell wire is present), the unbalanced wiring acts as an antenna and picks up these signals.

For a line that has already trained at a given rate/SNR margin, the rate remains constant but the remaining SNR margin is reduced by the interference. As the interference reduces (during the day) the SNR margin increases. Thus, the periodic variation in the strength of the interfering radio signals appears as a periodic variation in the measured SNR margin in the reference function.

The degree to which the SNR margin for a line varies depends on how well the circuit picks up the interfering signals. The technique described here seeks to find not just the intensity of the interference but also the degree of correspondence (or similarity) of the variation with the reference function.

The reference function f(t) selected here and described above is modelled using a capped cosine function of period one day.

The reference function f(t) can thus be represented by:

$$f(t) = A - B\cos\left(t \times \frac{2\pi}{24}\right), \text{ when } < C \quad (1)$$

$$f(t) = C, \text{ when } \left(A - B\cos\left(t \times \frac{2\pi}{24}\right)\right) \geq C \quad (2)$$

where A, B and C are configuration parameters, and t is the time of day in hours. The example function shown in FIG. 3 as plot 304 uses value of A=4, B=2 and C=4.

FIG. 3 also shows plot 302, which represents the downstream SNR margin of the line 106 as collected from step 200 for a selected 24 hour period (any 24 period can be used, though preference is for more recent periods as will be described later). Plot 304 is the reference function.

In step 206, the line analysis unit 118 compares the selected SNR margin data (from step 204) with the selected reference function.

The comparison can be done in a number of ways, with the following example describing a method using statistical analysis.

Figure 5:
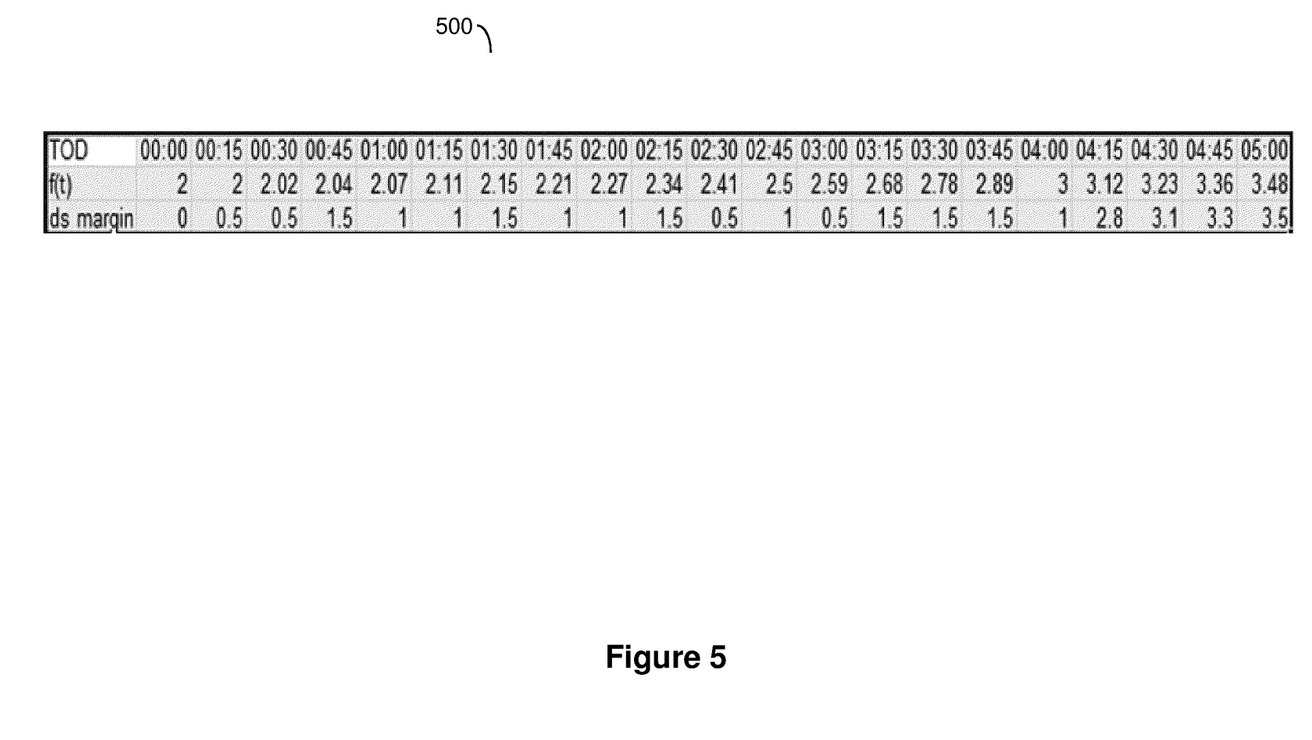
FIG. 5 is a table showing example values for the reference function and the downstream SNR margin arranged into common time bins.

In this example, the independent variable (the reference function f(t)) is aligned with the dependent variable (the selected downstream SNR margin) into common time bins. FIG. 5 shows a table 500 of such an alignment from 00:00 hours to 05:00 hours of the 24-hour period, with time bins of 15 mins in duration (conveniently, this is the same as the sampling interval for the SNR margin data). The time bins are shown in the row headed "TOD" (time of day), the reference function in the row headed "f(t)", and the selected downstream SNR margin in the row headed "ds margin".

Figure 6:
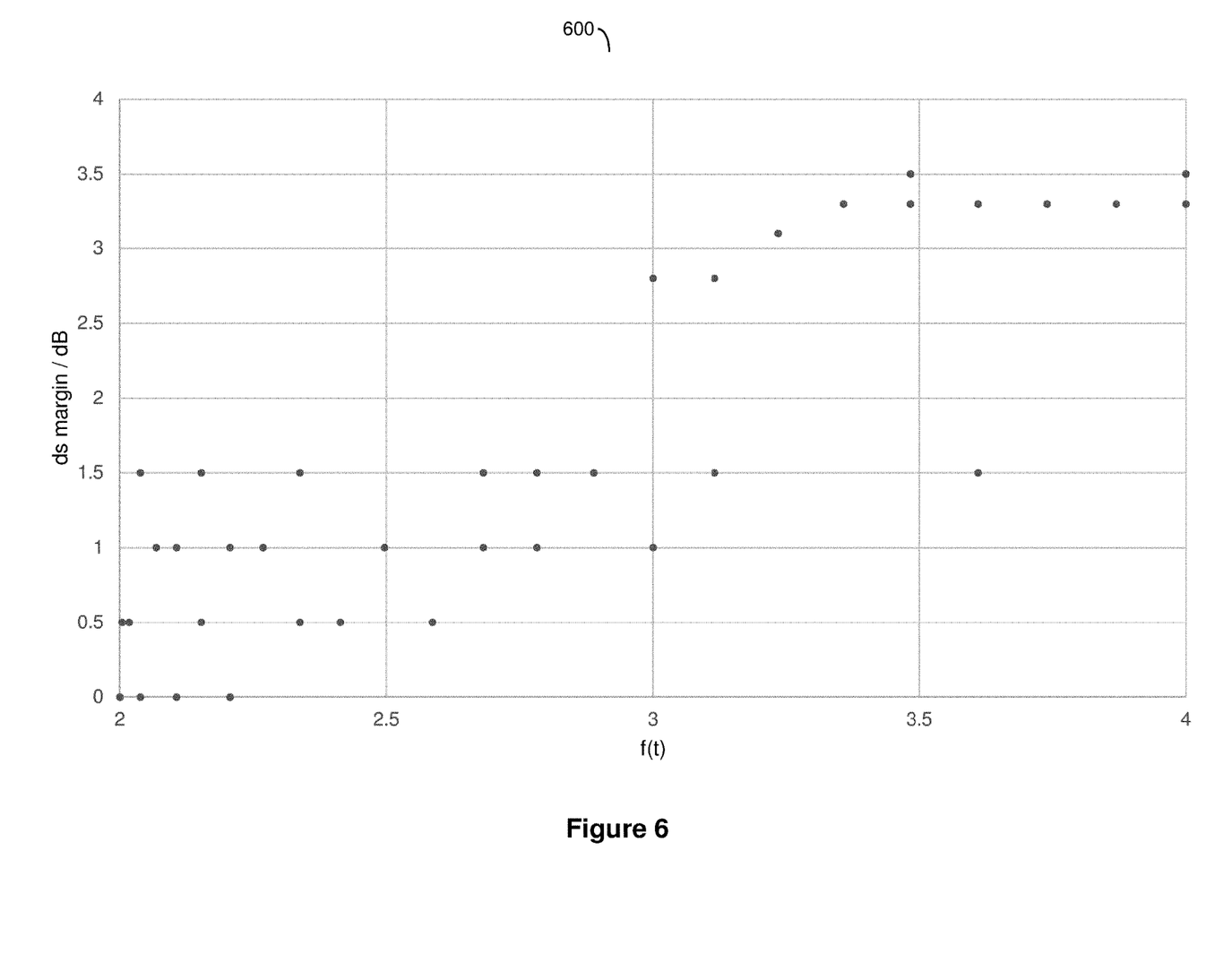
FIG. 6 is a scatter graph with downstream SNR margin plotted against a reference function in an example of the invention.

FIG. 6 shows the same results from table 500 graphically on a scatter plot 600, with "ds margin" plotted on the y-axis and "f(t)" on the x-axis.

The line analysis unit 118 can then perform linear regression analysis on the aligned data to determine the degree of similarity (or correlation) between the measured downstream margin and the reference function. This is done by setting "ds margin" as the dependent variable (X values), and the "f(t)" as the independent variable (Y values), and performing linear regression analysis to fit the straight line graph given by equation (3) below:

$$Y = a + bX \quad (3)$$

where a is the intercept, and b is the slope of the straight line graph.

The slope b represents a "strength of fit" and is determined using equation (4) below:

$$b = \frac{\Sigma XY - n\overline{X}\overline{Y}}{\Sigma X^2 - n\overline{X}^2} \quad (4)$$

where n is the number of time bins,
X is the value of the downstream SNR margin for a time bin,
Y is the value of the reference function for the same time bin,
ΣXY is the sum of the product of the X and Y over all of the time bins,
ΣX² is the square of X summed over all of the time bins,
ΣY² is the square of Y summed over all of the time bins, $\overline{X}$ is the arithmetic mean of X i.e. the sum of X for all time bins divided by n,
$\overline{Y}$ is the arithmetic mean of Y, and,
$\overline{X}^2$ is square of the arithmetic mean of X.

The intercept a is given by equation (5):

$$a = \overline{Y} - b\overline{X} \quad (5)$$

To determine how good a fit the straight line is defined by the variables a and b, we calculate a "quality of fit" parameter, r², given by equation (6) below:

$$r^2 = \frac{a\Sigma Y + b\Sigma XY - n\overline{Y}^2}{\Sigma Y^2 - n\overline{Y}^2} \quad (6)$$

The term r itself is known as the "product-moment correlation coefficient". Here, we have chosen to use the square of r to eliminate negative values.

Values for r² range from 0 to 1, and can be viewed as an indicator of how well correlated, or how similar, the X and Y values are. A value of 0 would indicate no correlation, and a value of 1 would indicate perfect correlation.

Thus in step 208, the line analysis unit 118 uses equations (4) and (6) to calculate slope b and r². As described above, b and r² are indicative of the strength of fit and quality of fit, or the similarity, between the measured SNR data and the reference function, which in turn indicates how susceptible the line is to RF interference.

So using equation (4), the line analysis unit 118 determines the slope b. The slope b is then rescaled to b' by multiplying b by B—the configuration parameter from equation (1):

$$b' = b \times 8 \quad (7)$$

Rescaling the slope to b' gives a value for the slope that is independent of B.

And using equation (6), the line analysis unit 118 determines the "quality of fit" parameter, r².

In step 210, the line analysis module 118 determines whether the line 106 is susceptible to RF interference or not by comparing b' and r² with predetermined thresholds, b_threshold and r²_threshold respectively.

As described above, r² can take values between 0 and 1, with 0 indicating no fit and 1 a perfect fit between the sets of data. In this example, the r²_threshold can be set to 0.7, which is a common value for identifying whether a linear regression has produced a sufficiently close fit.

As for the slope b', the threshold b_threshold can be determined from analysis of a population of lines and comparison with functions representing known lines experiencing RF interference. Typically a value over 4 would indicate a strong fit, a value over 1 but less than 4 indicating an average fit, and anything less than 1 indicating a weak fit.

If b' is greater than b_threshold, and r² is greater than r²_threshold, then the measured SNR data for the line shows a good fit with the reference function, and thus is classified as being susceptible to RF interference.

Figure 4:
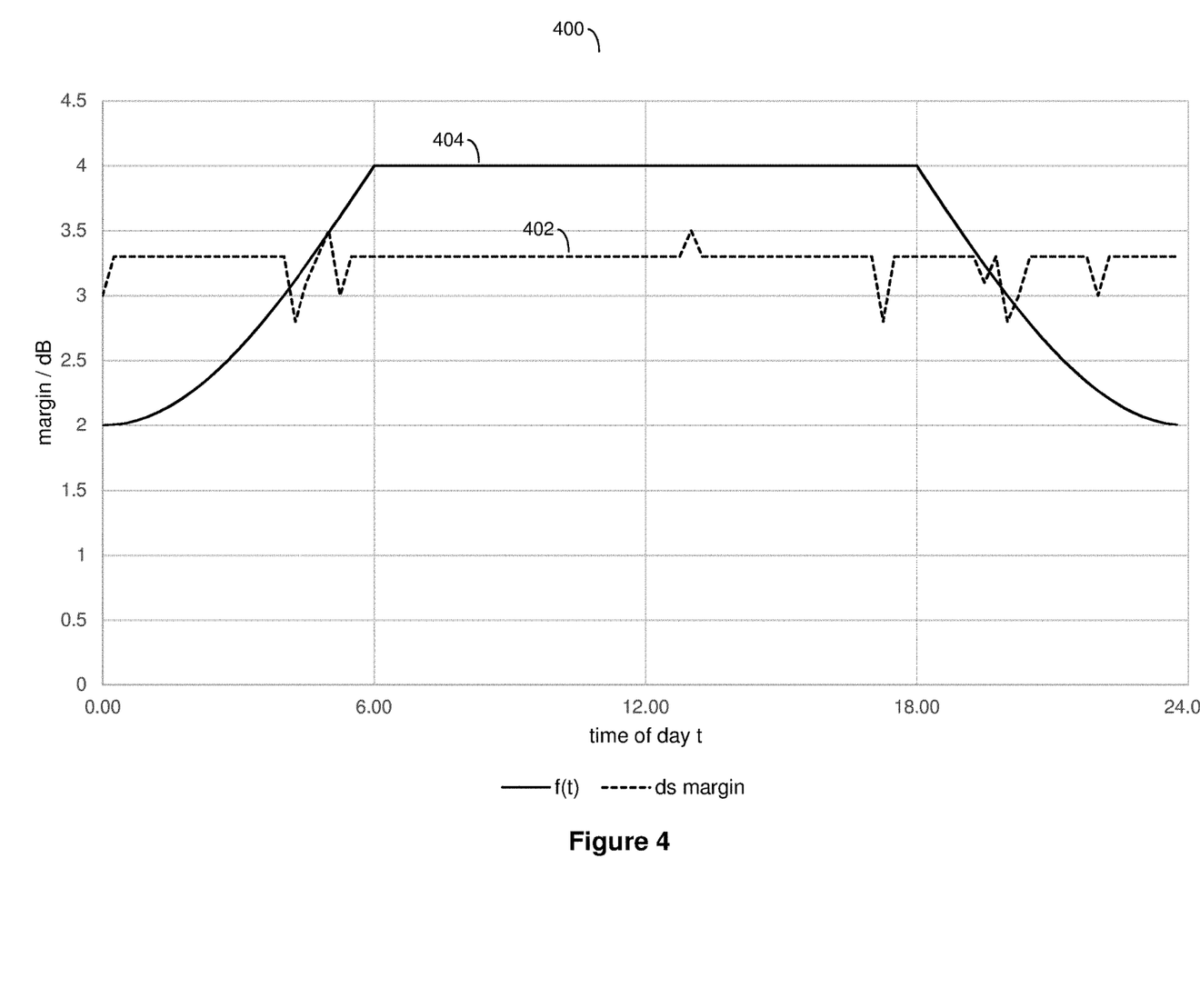
FIG. 4 is a graph showing the SNR margin of a line that is not susceptible to RF interference, and of a reference function, in an example of the invention.

In the example above shown in FIG. 3, plot 302 would be classified as being susceptible to RF interference (has a good similarity with the reference function—see plot 304). In contrast, FIG. 4, plot 402 represents a line that is not susceptible to RF interference (does not have a good similarity with the reference function—see plot 404).

The above method can be run over multiple days using many days' worth of data to reduce the likelihood of false classification. However, preference is for using data from more recent days, as historical RF interference susceptibility is not that important if the underlying problem has been more recently resolved.

Furthermore, as only a physical intervention can alter the wiring of a line in a manner that removes (or, less commonly, introduces) this condition, one would expect a sequence of positive results corresponding with wiring changes. For unbalanced conditions more typical of longer lines with decaying joints, a period of increasing RF susceptibility may be seen. It is possible that non-physical interventions, such as a line profile change could cause a discontinuity in the measured margin nullifying the detection for that day. Hence, multi-day assessments are beneficial.

As only cases of strong RF susceptibility need to be identified, there are some optional simple steps that can be performed initially that may eliminate the need for performing the more computationally complex methods described above.

The first relates to having sufficient SNR measurements. If there are not sufficient SNR measurements in the selected data (in step 202), then processing should not proceed. This is because a small data set may not guarantee adequate coverage of an entire day, leading to unreliable results.

The second relates to checking if there is sufficient SNR margin variation across the day first. If the maximum spread in SNR margin (i.e. max(ds margin)−min(ds margin)) is less than a certain value (e.g. 2 dB), then there won't be enough variation for a match with the reference function when compared later, so we can say straight away the line is not susceptible to RF interference.

In an alternative example, the line analysis unit 118 can reside in the CPE 124 for use in performing the operation of steps 200 to 210. The fault detection unit may need to be provided some of the data from the DSLAM and store measurements and threshold values locally.

Exemplary embodiments of the invention are realised, at least in part, by executable computer program code which may be embodied in an application program data. When such computer program code is loaded into the memory of the processor 120 in the line analysis unit 118, it provides a computer program code structure which is capable of performing at least part of the methods in accordance with the above described exemplary embodiments of the invention.

A person skilled in the art will appreciate that the computer program structure referred to can correspond to the flow chart shown in FIG. 2, where each step of the flow chart can correspond to at least one line of computer program code and that such, in combination with the processor 120 in the line analysis unit 118, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of determining an interference susceptibility of a digital subscriber line, said method comprising steps of:

measuring a signal to noise ratio margin of the digital subscriber line over a period time to obtain a measured signal to noise ratio margin of the digital subscriber line over the period time;

comparing the measured signal to noise ratio margin of the digital subscriber line over the period of time to a reference function to determine a degree of similarity between the measured signal to noise ratio margin and the reference function, wherein the reference function represents a signal to noise ratio margin over time and where the signal to noise ratio margin of the reference function is higher during a day and lower during a night, and the reference function repeats daily;

determining the interference susceptibility of the digital subscriber line based on the degree of similarity from the comparing step.

2. A method as claimed in claim 1, wherein the comparing step comprises performing numerical analysis of the signal to noise ratio margin and the reference function.

3. A method as claimed in claim 2, wherein numerical analysis comprises regression analysis.

4. A method as claimed in claim 3, wherein performing regression analysis generates a quality of fit parameter and a strength of fit parameter, and the comparing step further comprises comparing generated parameters with predetermined thresholds.

5. A method as claimed in claim 4, wherein a result of the comparing step is a result of the comparing of the generated parameters with the predetermined thresholds.

6. A method as claimed in claim 1 wherein the period of time is 24 hours.

7. A method as claimed in claim 1, wherein the signal to noise ratio margin is the downstream signal to noise ratio margin.

8. A line analysis unit for determining the interference susceptibility of a digital subscriber line at least adapted to:

measure a signal to noise ratio margin of the digital subscriber line over a period of time to obtain a measured signal to noise ratio margin of the digital subscriber line over the period time;

compare the measured signal to noise ratio margin over the period of time to a reference function to determine a degree of similarity between the measured signal to noise ratio margin and the reference function, wherein the reference function represents a signal to noise ratio margin over time and where the signal to noise ratio margin of the reference function is higher during a day and lower during a night, and the reference function repeats daily; determine the interference susceptibility of the digital subscriber line based on the degree of similarity from the comparing step.

9. The line analysis unit as claimed in claim 8, wherein the comparing of the measured signal to noise ratio margin over the period of time to the reference function comprises performing numerical analysis of the signal to noise ratio margin and the reference function.

10. The line analysis unit as claimed in claim 9, wherein numerical analysis comprises regression analysis.

11. The line analysis unit as claimed in claim 10, wherein performing regression analysis generates a quality of fit parameter and a strength of fit parameter, and the comparing of the measured signal to noise ratio margin over the period of time to the reference function further comprises comparing generated parameters with predetermined thresholds.

12. The line analysis unit as claimed in claim 11, wherein a result of the comparing of the measured signal to noise ratio margin over the period of time to the reference function is a result of the comparing of the generated parameters with the predetermined thresholds.

13. The line analysis unit as claimed in claim 12, wherein the period of time is 24 hours.

14. The line analysis unit as claimed in claim 8, wherein the signal to noise ratio margin is the downstream signal to noise ratio margin.

* * * * *